United States Patent
Chapatte et al.

(10) Patent No.: US 11,465,223 B2
(45) Date of Patent: Oct. 11, 2022

(54) METHODS AND PROCESSING UNIT FOR ELECTRIC DISCHARGE MACHINE

(71) Applicant: Agie Charmilles SA, Losone (CH)

(72) Inventors: Christian Chapatte, Peti Lancy (CH); Olçay Akten, Renens (CH); Roberto Perez, Geneva (CH)

(73) Assignee: Agie Charmilles SA, Losone (CH)

( * ) Notice: Subject to any disclaimer, the term of this patent is extended or adjusted under 35 U.S.C. 154(b) by 293 days.

(21) Appl. No.: 16/720,777

(22) Filed: Dec. 19, 2019

(65) Prior Publication Data

US 2020/0198038 A1    Jun. 25, 2020

(30) Foreign Application Priority Data

Dec. 20, 2018   (EP) .................................. 18214544

(51) Int. Cl.
 *B23H 7/18*   (2006.01)
 *B23H 7/26*   (2006.01)
 *B23H 1/06*   (2006.01)
 *B23H 1/04*   (2006.01)

(52) U.S. Cl.
 CPC .............. *B23H 7/18* (2013.01); *B23H 1/04* (2013.01); *B23H 1/06* (2013.01); *B23H 7/265* (2013.01)

(58) Field of Classification Search
 CPC ... B23H 7/18; B23H 1/04; B23H 7/20; B23H 7/265; G05B 2219/45221; G05B 2219/45224
 See application file for complete search history.

(56) References Cited

U.S. PATENT DOCUMENTS

| 5,224,048 A | * | 6/1993 | Ohba | B23H 7/20 219/69.13 |
| 6,326,576 B1 | * | 12/2001 | Krenz | B23H 1/00 219/69.11 |
| 6,791,055 B1 | | 9/2004 | Katougi | |
| 2018/0266935 A1 | | 9/2018 | Jaques et al. | |

FOREIGN PATENT DOCUMENTS

| DE | 2223284 A1 | | 11/1972 | |
| EP | 2610027 A1 | | 7/2013 | |
| JP | 61241023 A | * | 10/1986 | ............... B23H 1/00 |

(Continued)

OTHER PUBLICATIONS

Machine translation of Japan Patent No. 8-011,017-A, Dec. 2021.*

(Continued)

*Primary Examiner* — Geoffrey S Evans
(74) *Attorney, Agent, or Firm* — Harness, Dickey & Pierce, P.L.C.

(57) ABSTRACT

A method for preprocessing data related to a tool electrode, which is applied in an EDM machine to manufacture a part comprises: generating an electrode model for the tool electrode based on the geometry of the part; generating the cavity shape model (volume of the part to erode), combining the electrode and cavity shape model, dividing the resulting model into a plurality of slices in a plurality of parallel planes, wherein at least one slice is composed of at least two sections, which are topologically disconnected; and generating for each slice a slice-geometry data, and generating an electrode-geometry data including the slice-geometry data.

13 Claims, 6 Drawing Sheets

(56) References Cited

FOREIGN PATENT DOCUMENTS

| JP | H03149133 A | | 6/1991 |
|---|---|---|---|
| JP | 08011017 A | * | 1/1996 |
| JP | 09253936 A | * | 9/1997 |
| JP | 2004142084 A | | 5/2004 |
| JP | 2004291097 A | * | 10/2004 |

OTHER PUBLICATIONS

Machine translation of Japan Patent No. 9-253,936-A, Dec. 2021.*
Machine translation of Japan Patent No. 2004-291097-A, Dec. 2021.*
Extended European Search Report dated Jun. 17, 2019 for Application No. 18214544.1-1019 (9 pages).

* cited by examiner

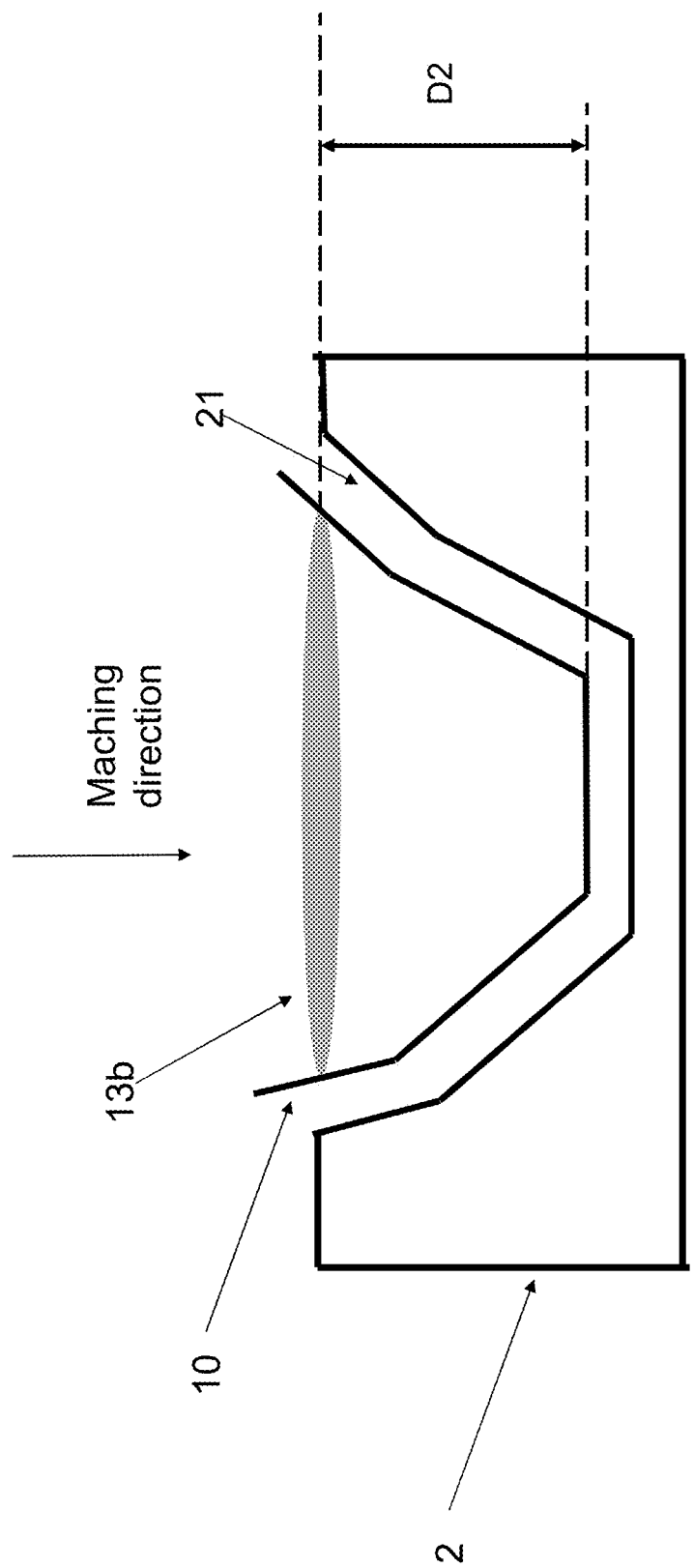

METHODS AND PROCESSING UNIT FOR ELECTRIC DISCHARGE MACHINE

CROSS-REFERENCE TO RELATED APPLICATION

This application claims the benefit and priority of European Patent Application No. 18214544.1 filed Dec. 20, 2018 and is incorporated by reference herein in its entirety.

FIELD OF THE INVENTION

The present invention is directed to a method for preprocessing data applied in an EDM machine, and a processing unit. In particular, the present invention is directed to a method for determining machining conditions for an EDM machine, in particular a die-sinking EDM machine and a control unit for conducting this method. In further, the present invention is related to a system including a plurality of EDM machines, the processing unit and the control unit.

BACKGROUND OF THE INVENTION

EDM process is a well-known process to produce parts by using a tool electrode. A workpiece is mounted on the machine table and the tool electrode is mounted above the workpiece with a defined distance to the workpiece, thereby a machining gap is formed between the electrode and the workpiece. Electrical impulses applied across the machining gap filled with a machining fluid cause electrical discharges and thereby remove the material from the workpiece. Since the final produced part has a complementary shape of the tool electrode, the distortion of the electrode geometry can be directly reported as distortion on the part. Therefore, the accuracy of the electrode shape has a direct impact on the accuracy of the part machined by the electrode. The electrical discharge causes also wear of the tool electrode. In order to achieve a low electrode wear and high removal rate, the machining conditions must be optimized depending on the electrode shape. Especially, the cross section of the electrode exposed to the workpiece is an essential parameter to determine the machining conditions, especially the machining power. Machining power is the effective power delivered across the gap by electrical discharges, between the electrode and the workpiece, and defined for instance by the discharge impulse voltage, discharge impulse current, discharge impulse duration and discharge impulse pause time.

In normal cutting condition the size of the cross section changes with the machining depth. At the beginning of the process, the bottom surface of the electrode is exposed to the workpiece. When the electrode sinks deeper into the workpiece, the area of the cross section of the tool electrode exposed to the workpiece becomes larger. Consequently, the machining condition must be adjusted, for example higher machining power is required to ensure the remove rate. However, if the machining power is set to high, the wear of the tool electrode will be higher, which should be avoided. Therefore, the size of the cross section of the tool electrode at different machining depth is essential information to ensure the optimum machining conditions.

JPH03149133 discloses a cutting tool for cutting the electrode material based on data from a program preparing device. The electrode height and surface area are stored and used to determine the processing condition. But the area is the whole surface area of the electrode. If an electrode having at least two sections is applied in the EDM machine, the power is set for the total surface area. This may lead to large electrode wear or even damage the electrode, since one section of the electrode may have a small surface area and the power is based too high for this section having a smaller area.

EP 2 610 027 discloses another method to optimize the machining condition by identifying the position where the discharge occurs.

SUMMARY OF THE INVENTION

It is an aspect of this invention to provide a method for preprocessing data applied in an EDM machine to improve the machining productivity. In particular, it is an objective of this invention to provide a method to optimize the machining conditions to ensure a sufficient material removing and reduced electrode wear.

According to the preferred embodiment of the present invention, these objectives are achieved through the features described in the foregoing specification.

In the present invention, a method for preprocessing data applied in an EDM machine comprises generating an electrode model for a tool electrode based on the geometry of a part to be produced by the EDM machine using the tool electrode, dividing the electrode model into a plurality of slices in a direction of perpendicular to the machining direction when the tool electrode is mounted into the EDM machine. The tool electrode comprises at least two sections, which are topologically disconnected. The method further comprises generating for each slice slice-geometry data and generating electrode-geometry data including slice-geometry data for each slice.

The electrode model for the tool electrode can be generated for example using a computer-aided design program (CAD). At a first step, a part to be produced is designed for example using the CAD. The cavities to be formed in the part are determined such that the tool electrode having the proper geometry to machining the cavities can be designed. The electrode model can be generated based on the CAD data used to design the tool electrode. Cavities of the part on the 3D CAD file can be automatically recognized and used for generating electrode geometry and define machining positions. The electrode model representing the tool electrode geometry provides a possibility to analyze the electrode geometry and to preprocess the data required for the control of the machine and thereby optimize the machining process without compromising the precision. For example, different sections can be determined and the geometry of the electrode can be analyzed in advance. This provides the advantage of optimizing the die-sinking-EDM process based on the real geometry of the electrode to further improve the manufacturing accuracy.

The electrode model is divided into a plurality of slices in a direction of perpendicular to the machining direction when the tool electrode is mounted into the EDM machine. From the data including all the geometry information of the electrode, the slices can be generated by dividing the electrode model in a plurality of parallel planes. Each slice has a defined thickness. The thickness of different slices may vary depending on the geometry of the electrode. The area of the cross-section of the slice depicts the eroding surface area during the discharging machining. During the discharging machining, in particular in the die-sinking discharging machine, for different machining depth the electrode has different eroding surfaces facing the workpiece.

It is well known that EDM process is generally used to produce the parts having complex structures, for example having several cavities with different geometry. The shape of the tool electrode is mapped to the shape of the cavity in the parts. Therefore, the tool electrode having at least two sections must be used to erode a workpiece to form different cavities.

In order to fulfill the requirements for different machine producers, the electrode-geometry data can be exported into different file formats. The electrode-geometry data comprises a set of slice-geometry data representing the geometry of each slice.

In the present invention a method for preprocessing data related to a tool electrode, which is applied in an EDM machine to manufacture a part comprises the following steps: generating an electrode model for the tool electrode based on the geometry of the part; generating a cavity shape model, combining the electrode model and the cavity shape model, dividing the combined model into a plurality of slices in a plurality of parallel planes, wherein at least one slice is composed of at least two sections, which are topologically disconnected, and generating for each slice slice-geometry data, and generating electrode-geometry data including the slice-geometry data. The cavity shape model defines the volume of the part to be eroded.

In one variant, the electrode model is divided into the plurality of slices based on the change of the profile of the electrode geometry. A sufficient number of slices should be provided to follow the geometry change of the electrodes in order to provide the optimized machining condition to each discharge occurred between the tool electrode and the workpiece, however, if the cross sections of each slice remains the similar shape, no addition slice is generated, since no adapting of the machining condition is required. This strategy ensures the precise machining, reduces the machining time, and controls the wear of electrodes in particular the segments dedicated to fine features.

An algorithm is applied to generate the slices at the right positions of the electrode is applied. The aim of the algorithm is to give a geometrical description of the cavity shape in order to select the best possible machining conditions for the EDM process. The shape and dimensions of the electrode can vary drastically from one EDM operation to another one. Therefore, the applied machining condition has to be adapted depending on these variations. For example, the machining power must be adjusted to the size of the cross-section of the electrode. In order to decrease the computation time, the basic approach is to select a limited number of positions along the electrode, where a slice is to be generated. The algorithm is applied to determine the slice position (Hvalue), and to calculate the corresponding cross-section surface (Scalc) and the volume to erode (Verode), where the Scalc gives an indication of the machining power setting which has to be applied. For each material couple part/electrode and the application type, a surface reference table is provided. These tables are located in the machine database and were created experimentally. Beside the surface reference levels (Sreference) and the corresponding machining power settings, the table contains also a tolerance value (Htolerance) which has to be considered when changing the machining power setting. The tolerance is a distance along the electrode between the point, where the surface reference changes from a lower to a higher level and defined by the formula below $$H_{new}=H_{last}+\text{coefficient}\times H_{tolerance}$$

$$H_{new}=H_{last}+\text{coefficient}*H_{tolerance}.$$

The principle of the algorithm is to determine best possible slice positions to apply specific power settings. The first step is to define the first slice of the cavity and to calculate the machining depth. For this, a plane perpendicular to the machining direction is created on the top of the cavity. Then, the electrode is translated along the machining direction until it intersects with the plane. The obtained electrode location is stored as the first slice Hcontact=0 and the Scalc, Verode and the cross-section area are calculated. The Scalc value is then compared to get the correct Sreference level in the table in order to select the adapted machining power setting for the actual slice.

The iterative calculation of the optimal new slice position is applied according the following steps:

a. determine the new position Hnew by applying the following formula, $$H_{new}=H_{last}+\text{coefficient}\times H_{tolerance}.$$

The coefficient was determined experimentally and helps to reduce the slice numbers.

b. Calculate Scalc value at the new position Hnew.

c. If the calculated Scalc is smaller than the next higher Sreference level in the table then the new position Hnew increases by using again the formula given in the step a.

d. If the calculated Scalc is larger or equal to the next higher Sreference value in the table then the coefficient used in step a. will be reduced and the Hnew value will be recalculated by using the formula $$H_{new}=H_{last}+\text{coefficient\_new}*H_{tolerance}.$$

e. The iteration stops when the coefficient reaches its minimal value and the calculated Scalc is larger or equal to the next higher Sreference level in the table. Then, the slice position from the previous step is selected as the optimal final position for the current iteration.

f. The complete electrode analysis will be finished when the last optimum position corresponds to the machining depth.

The slice-geometry data includes all the information related to the geometry of each slice, for example the slice position, the corresponding surface Scalc. It comprises one or more of the following information: position of the slice, cross-section area of the slice, at least one lateral surface area of the slice, and the volume of the slice. This provides the flexibility to determine the machining condition based on any of the geometry information.

In one preferred variant, a machining condition is determined for each slice based on the slice-geometry data, in particular the cross-section area of the slice. The cross-section area is an essential parameter to determine the machining power. If the cross-section area is large, the machining power should be set high to ensure a defined removal rate. But if the cross-section area is small, the machining power should be lowered to reduce the wear of the tool electrode and avoid damaging the electrode.

The machining condition defines the parameters applied in the EDM process, for example, machining power.

In a preferred variant, for each slice the area of the cross section, namely the surface toward to the workpiece, when the electrode is mounted in the machine, is calculated based on the electrode model. Especially for the electrode having a plurality of parts, for each slice the minimum area of the cross sections among the sections of the electrode is calculated and defined as a characteristic data. The slice-geometry data may include the characteristic data.

Depending on the cavities to be formed, the geometry of the different sections of the tool electrode can have large difference. In this situation, setting the machining condition based on the minimum cross-section arear may delay the machining time and reduce the productivity. This problem can be improved by setting a threshold value. If the difference of the cross-section area between different sections of the tool electrode is larger than a threshold value, the machining condition is determined as one of the following: applying at least two separate tool electrodes, each has a shape of the section of the electrode; and defining for each section a machining condition.

A more precision setting of the machining condition can be achieved when the real geometry of tool electrode can be measured and compared with the electrode-geometry data, which is generated from the electrode model. In one embodiment, the method further comprises receiving the electrode-geometry data; generating the tool electrode by a machining tool; measuring the geometry of the generated tool electrode and adjusting the determined machining condition based on measured geometry of the generated tool electrode. It is considerable to realize a process involving different types of machines, e.g. the milling machining tool, laser machining and EDM. In a preferred variant, the electrode-geometry data is received by a milling machining tool, for example stored in the computer-aided manufacturing program (CAM). After the tool electrode is manufactured by the milling tool according to the electrode-geometry data, the real geometry of the tool electrode can be measured and compared with the electrode-geometry data.

In the present invention, a preprocessing unit is configured to generate an electrode model for a tool electrode based on the geometry of a part to be produced by the EDM machine using the tool electrode, to divide the electrode model into a plurality of slices in a plurality of parallel planes or in a direction of perpendicular to the machining direction in the application of 3-axis EDM machine when the tool electrode is mounted into the EDM machine, wherein the tool electrode comprises at least two sections. The preprocessing unit is further configured to generate electrode-geometry data including slice-geometry data for each slice. The preprocessing unit can be a standalone unit or integrated into the control unit of the EDM machine. Moreover, the preprocessing unit can be configured to provide a data format which features a high compatibility.

In the present invention, a central control unit is configured to determine for each slice a machining condition based on the slice-geometry data, in particular the cross-section area. It is possible to integrate the preprocessing unit into the central control unit.

In the present invention, An EDM machine comprises a control unit, which is configured to receive the electrode-geometry data and determine the machining condition based on the electrode-geometry data.

In the present invention, a system comprises a plurality of EDM machines, a preprocessing unit, a central control unit. An improved automation can be realized to include the different types of machining tools, measurement devices and robots to transfer the workpiece between different machining.

In another variant, the central control unit is configured to control at least one machining tool to produce the electrode and/or measure the geometry of the produced electrode. It is possible to design the central control unit such that the machining condition can be adjusted based on the measured real geometry of the electrode. By this way the precision of the electrode is improved, which directly improves the precision of produced part.

In one variant, the slice-geometry data is sent to the central control unit to calculate the machining condition or to select a machining condition from the stored data, for example, a table including the geometry information of the electrode, the material of electrode and workpiece and the corresponding machining conditions is provided based on the experimental data. The determined machining condition can be exported to the control unit of the EDM machine to produce the part. The slice-geometry data format can be standard CAD data formats, e.g. stp, igs or xt.

A good result may be obtained if the machining depth is monitored. By comparing the machining depth, the corresponding slice can be selected and the characteristic data thereof can be obtained. As explained above, the slices and the characteristic data are preprocessed before the manufacturing; therefore, these data can be obtained very fast. In an advantageous variant, a lookup table is generated based on the electrode model. The table includes the information regarding the machining depths, the number of the corresponding slice and the calculated characteristic data. Such data can be stored in a central data storage, which is remotely assessable from the EDM machine or can be transferred into a storage arranged in the machine before the manufacturing.

BRIEF DESCRIPTION OF THE DRAWINGS

In order to describe the manner in which advantages and features of the disclosure can be obtained, in the following a more particular description of the principles briefly described above will be rendered by reference to specific embodiments thereof which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which:

FIG. 1a illustrates another schematic;

DESCRIPTION OF THE PREFERRED EMBODIMENTS

To simplify the explanation of the invention, the embodiments shown in the figures are based on a 3-axis EDM machine. The machining direction is the vertical direction, namely the z direction indicated in the figures. However, the present invention is not limited to the 3-axis EDM machine but can be used in other multi-axis EDM machine, for example a 5-axis EDM machine.

Figure 1:
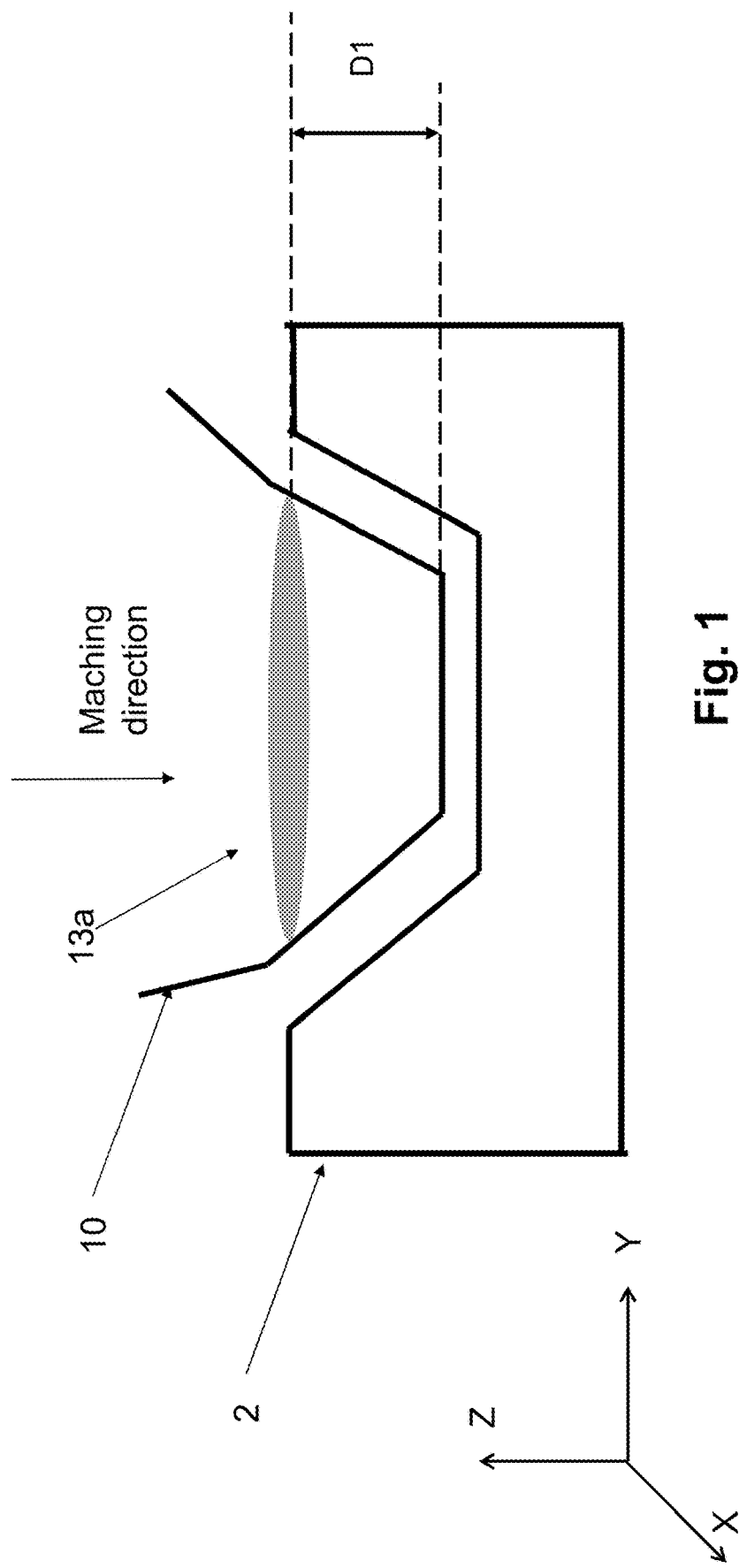
FIG. 1 illustrates a simplified schematic of an electrode and a workpiece.

FIGS. 1 and 1a show schematics of an electrode 10 being mountable in an EDM machine 1 for machining a workpiece 2. During the machining the electrode is mounted in the EDM machine in the Z-direction. The workpiece 20 is mounted on a machine table of the EDM machine. In particular, FIGS. 1 and 1a present the states where the electrode sinks into the workpiece in the machining direction with a machining depth of D1 and D2, respectively. The cross-section area of the electrode varies with the machining depth. The circle illustrates the cross-section area of the electrode in the corresponding machining state. For example, for the machining depth D1, the cross-section area of the electrode is 13a whereas for the machining depth D2, the cross-section area 13b of the electrodes is increased.

In order to manufacture a part having a defined geometry, an electrode having a complementary geometry must be used to machine the workpiece to realize the required geometry of the part. FIGS. 1 and 1a show a simplified example to manufacture a part having one cavity 21. However, most of parts manufactured by EDM having more than one cavity and the dimensions of the cavities may vary as well. To design the electrode, an electrode model based on the required geometry of the part is generated.

Figure 2:
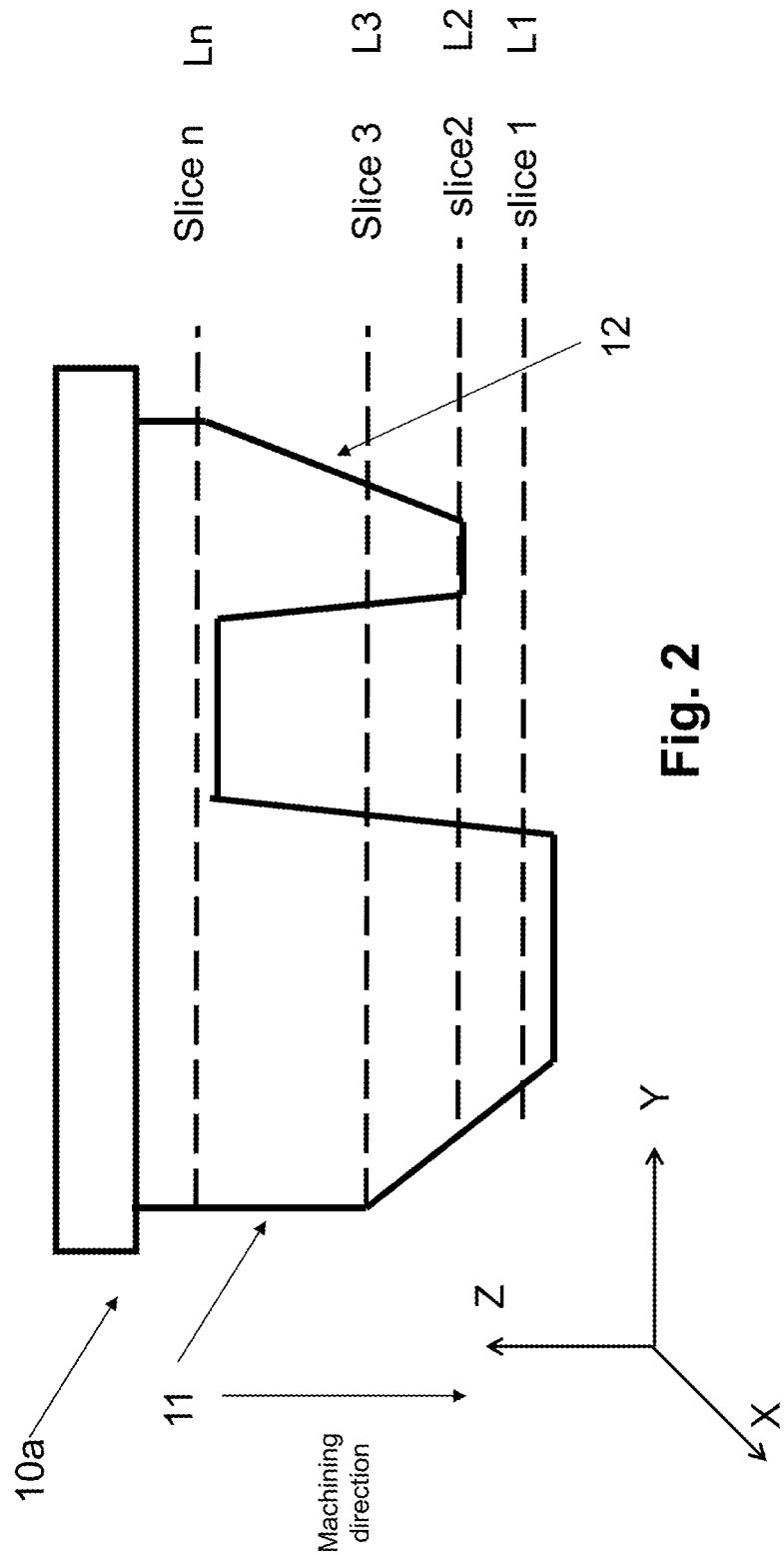
FIG. 2 illustrates a simplified schematic of dividing electrode model into slices.

FIG. 2 illustrates a simplified schematic of dividing the electrode model 10a into a plurality of slices. The electrode shown in FIG. 2 represents merely an example. The application of the method of the present invention is not limited by the shape of the electrode. FIG. 2 shows an electrode having a first section 11 and a second section 12. As shown in FIG. 2, an electrode model is divided into a plurality of slices in a plurality parallel planes which are perpendicular to the Z-direction. In order to optimize the number of slices, the profile change in the Z-direction of the electrode is considered. As illustrated in FIG. 2, the first slice is selected at the position L1. The second slice is selected at the position L2, because the profile of the electrode changes at this position L2. At the position L1 only the first section of the electrode is present whereas at the position L2 the first section and the second section are present. At the position L3, the profile of the electrode changes again, because the cross-section area of the first section of the electrode is larger than the cross-section arear at the position L2. At the position Ln the first section and the second section are merged, therefore, another slice n is generated at this position.

Figure 3:
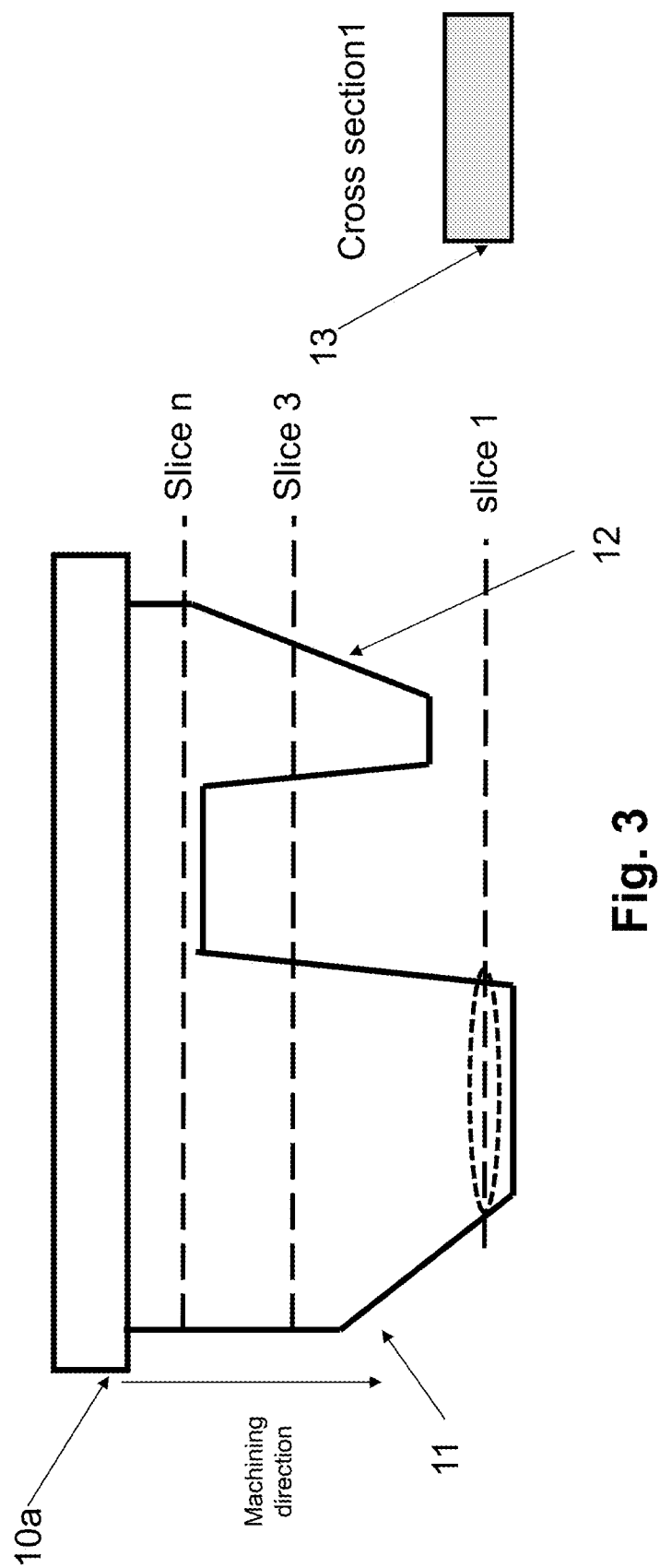
FIG. 3 illustrates a top section of one slice.
Figure 4:
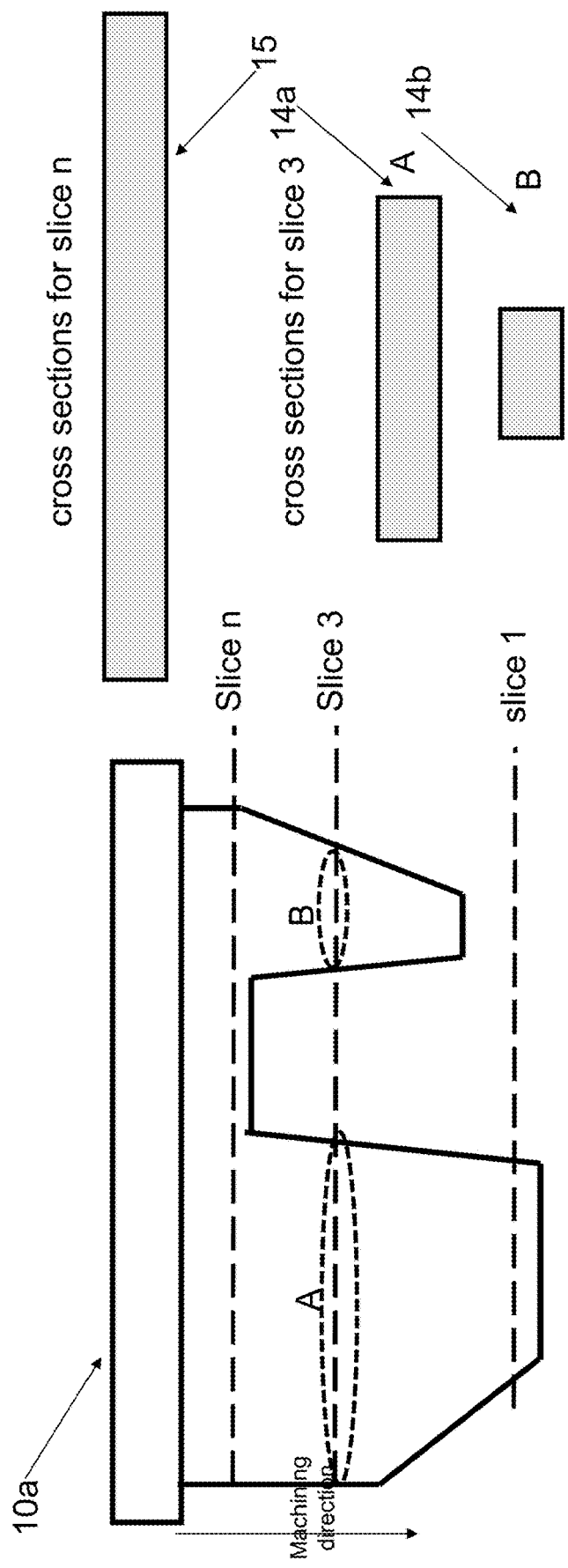
FIG. 4 illustrates top sections of another slice.

The corresponding cross-sections areas of the slices 1, 3 and n are shown in FIGS. 3 and 4. Each slice comprises different cross-section of different sections of the electrode. Slice 1 includes the cross section 13 of the first section 11, slice 3 includes the cross sections 14a and 14b of the first section 11 and the second section 12. A is the cross section 14a of the first section and B is the cross section 14b of the second section 12. The slice n includes the cross section 15 of the merged first section and the second section. In order to determine the machining conditions, for example the machining power applied to the electrode, the minimum area of the cross-sections for each slice is determined and the machining power is adapted based on the minimum area of the cross sections. For example, the minimum area of cross section for slice 1 is the cross section 13 of the first section and the minimum area of the cross section for slice 3 is cross section B 14b of the second section 12.

During the machining the electrode sinks into the workpiece and thereby different cross sections are involved at different machining depth. For example, at the beginning of machining, the cross section 13 of the first part 11 is involved. When the electrode sinks further into the workpiece, the top sections 14 and 14a of the first part and the second part of the electrode are involved. When the electrode sinks further into the workpiece, the top sections of the merged part of the first part and the second part is involved. Depending on the cross section of the electrode, corresponding machining power has to be set.

Figure 5:
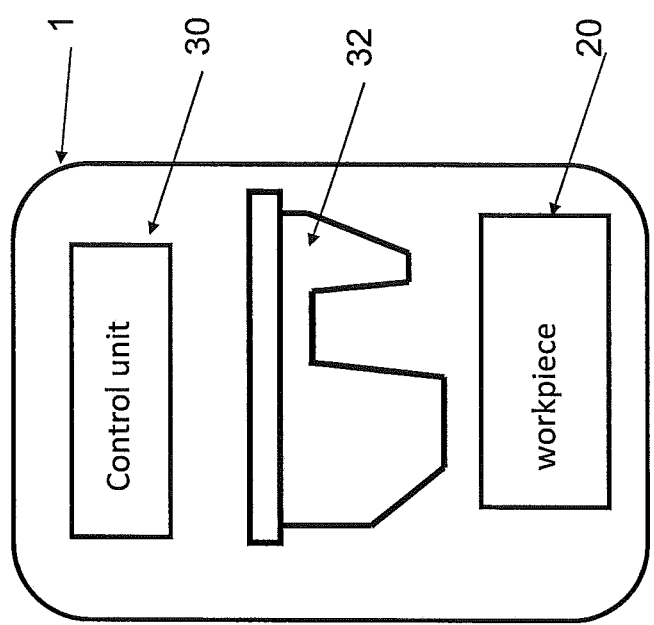
FIG. 5 illustrates a schematic of an EDM machine.

FIG. 5 shows a schematic of an EDM machine, which comprises an electrode and a workpiece and a control unit. The control unit 30 is configured to receive the preprocessed data related to the electrode model in particular the electrode-geometry data. The control unit is further configured to determine the machining depth. The machining power to be applied currently for this machining depth can be calculated based on acquired machining depth and the received electrode-geometry data. It is also considerable to input the machining conditions directed to each slice from an external device.

Figure 6:
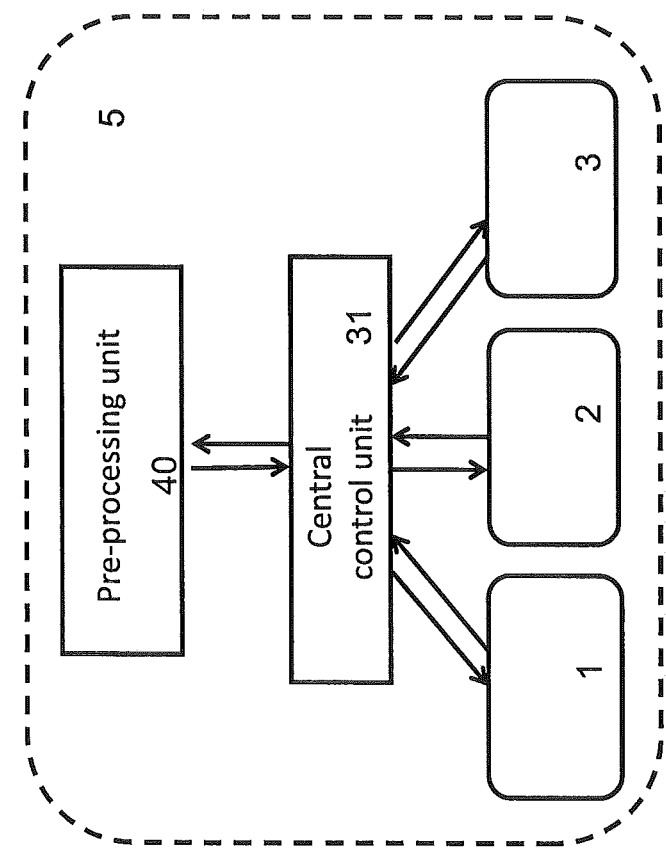
FIG. 6 illustrates a schematic of a system.

FIG. 6 shows a system comprising a plurality of EDM machines. A central control unit 31 and a preprocessing unit 40 are embedded in the system. The central control unit 31 receives a machining parameter from one of the EDM machine and sends an inquiry to the preprocessing unit to obtain a characteristic data for this EDM machine and this machining parameter. The preprocessing unit sends the characteristic data to the central control unit. In one variant, the central control unit sends this characteristic data further into the corresponding EDM machine such that the machining power can be calculated within this machine. In another variant, the central control unit calculates the machining power and sends the calculated machining power to the corresponding machine.

The invention claimed is:

1. A method for preprocessing data related to a tool electrode, which is applied in an EDM machine to manufacture a part, the method comprising:
generating an electrode model for the tool electrode based on the geometry of the part;
dividing the electrode model into a plurality of slices in a plurality of parallel planes, wherein at least one slice is composed of at least two sections, which are topologically disconnected;
generating for each slice slice-geometry data;
generating electrode-geometry data including the slice-geometry data; and
determining for each slice a machining condition based on a cross-section area of the slice, thereby completing the method prior to machining.

2. The method according to claim 1, wherein the electrode model is divided into the plurality of slices based on the change of the profile of electrode model in the direction of perpendicular to the plurality of parallel planes.

3. The method according to claim 2, wherein if the difference of the cross-section area between the sections of the same slice is larger than a threshold value, the machining condition is determined as one of the following:
a. applying at least two separate tool electrodes corresponding to the shape of the sections; or
b. defining for each section an individual machining condition.

4. A method according to claim 2, wherein for each slice the minimum cross-section area of the sections is calculated to determine the machining condition.

5. A method according to claim 4, wherein the machining condition is one or more of: machining power, preferably, voltage applied to the gap between the electrode and workpiece, current applied to the gap between the electrode and workpiece and pulse duration applied to the gap between the electrode and workpiece and pulse pause time applied to the gap between the electrode and workpiece.

6. The method according to claim 1, wherein the slice-geometry data comprises one or more of: slice position, the cross-section area of the slice, at least one lateral surface area of the slice, and the volume of the slice.

7. The method according to claim 1 further comprising:
exporting the electrode-geometry data;
manufacturing the tool electrode using the electrode-geometry data;
measuring the geometry of the manufactured tool electrode;
modifying the determined machining conditions by comparing the measured geometry with the electrode-geometry data.

8. A method for manufacturing a part using an EDM comprising:
receiving the electrode-geometry data generated according to claim 1;
receiving the machining conditions according to claim 1; and
manufacturing the part using the received electrode-geometry data and the machining conditions.

9. The method according to claim 8, further comprising determining a machining depth and selecting a slice based on the determined machining depth and deriving the machining conditions corresponded to the selected slice.

10. The method according to claim 1, wherein the method is performed by a preprocessing unit.

11. The method according to claim 1, wherein the method is performed by a central control unit.

12. The method according to claim 1, wherein the method is conducted by an EDM machine.

13. The method according to claim 1, wherein the method is performed by a system including a preprocessing unit, a central control unit, and a plurality of EDM machines.

\* \* \* \* \*